United States Patent
Van Wiemeersch et al.

(10) Patent No.: US 8,665,078 B2
(45) Date of Patent: Mar. 4, 2014

(54) WIDTH CALIBRATION OF LANE DEPARTURE WARNING SYSTEM

(75) Inventors: John Robert Van Wiemeersch, Novi, MI (US); Jeffrey Wallat, Canton, MI (US); Brian Bennie, Sterling Heights, MI (US); Steven Yellin Schondorf, Dearborn, MI (US); Brian Wolski, Dearborn, MI (US); Timothy Prodin, Dearborn, MI (US)

(73) Assignee: Ford Global Technologies, Dearborn, MI (US)

( * ) Notice: Subject to any disclaimer, the term of this patent is extended or adjusted under 35 U.S.C. 154(b) by 260 days.

(21) Appl. No.: 13/190,010

(22) Filed: Jul. 25, 2011

(65) Prior Publication Data

US 2013/0027195 A1   Jan. 31, 2013

(51) Int. Cl.
*G08B 21/00*   (2006.01)

(52) U.S. Cl.
USPC .......................... 340/431; 340/901; 340/425.5

(58) Field of Classification Search
USPC .............. 340/431, 435–436, 425.5, 901, 933, 340/937, 438–439
See application file for complete search history.

(56) References Cited

U.S. PATENT DOCUMENTS

| | | | |
|---|---|---|---|
| 6,198,386 B1* | 3/2001 | White, II | 340/435 |
| 7,367,407 B2* | 5/2008 | Lannert | 172/684.5 |
| 7,561,032 B2* | 7/2009 | Huang et al. | 340/435 |
| 7,566,851 B2* | 7/2009 | Stein et al. | 250/205 |
| 7,737,832 B2* | 6/2010 | Baratoff et al. | 340/435 |
| 2005/0242931 A1 | 11/2005 | Gunderson et al. | |
| 2007/0179697 A1 | 8/2007 | Holler | |
| 2008/0186204 A1 | 8/2008 | Buckley | |
| 2010/0039722 A1* | 2/2010 | Lee et al. | 359/843 |
| 2011/0140872 A1* | 6/2011 | McClure | 340/431 |

FOREIGN PATENT DOCUMENTS

DE   102006013817   9/2007

* cited by examiner

*Primary Examiner* — Daniel Previl
(74) *Attorney, Agent, or Firm* — Angela M. Brunetti; Frank MacKenzie

(57) ABSTRACT

A lane departure warning system has a trailer detector for detecting that a trailer is attached to a vehicle, a lane boundary detector for detecting a position of a lane boundary on a roadway over which the vehicle is travelling, and an information processor including a calibrator for generating calibration parameters used in determining an unintended lane departure event with respect to the lane boundary. The information processor initiates a process for allowing a vehicle operator to provide trailer width information when the trailer detector indicates that the vehicle has the trailer attached thereto. The trailer width information is used by the information processor for generating the calibration parameters as a function of a width of the trailer.

23 Claims, 5 Drawing Sheets

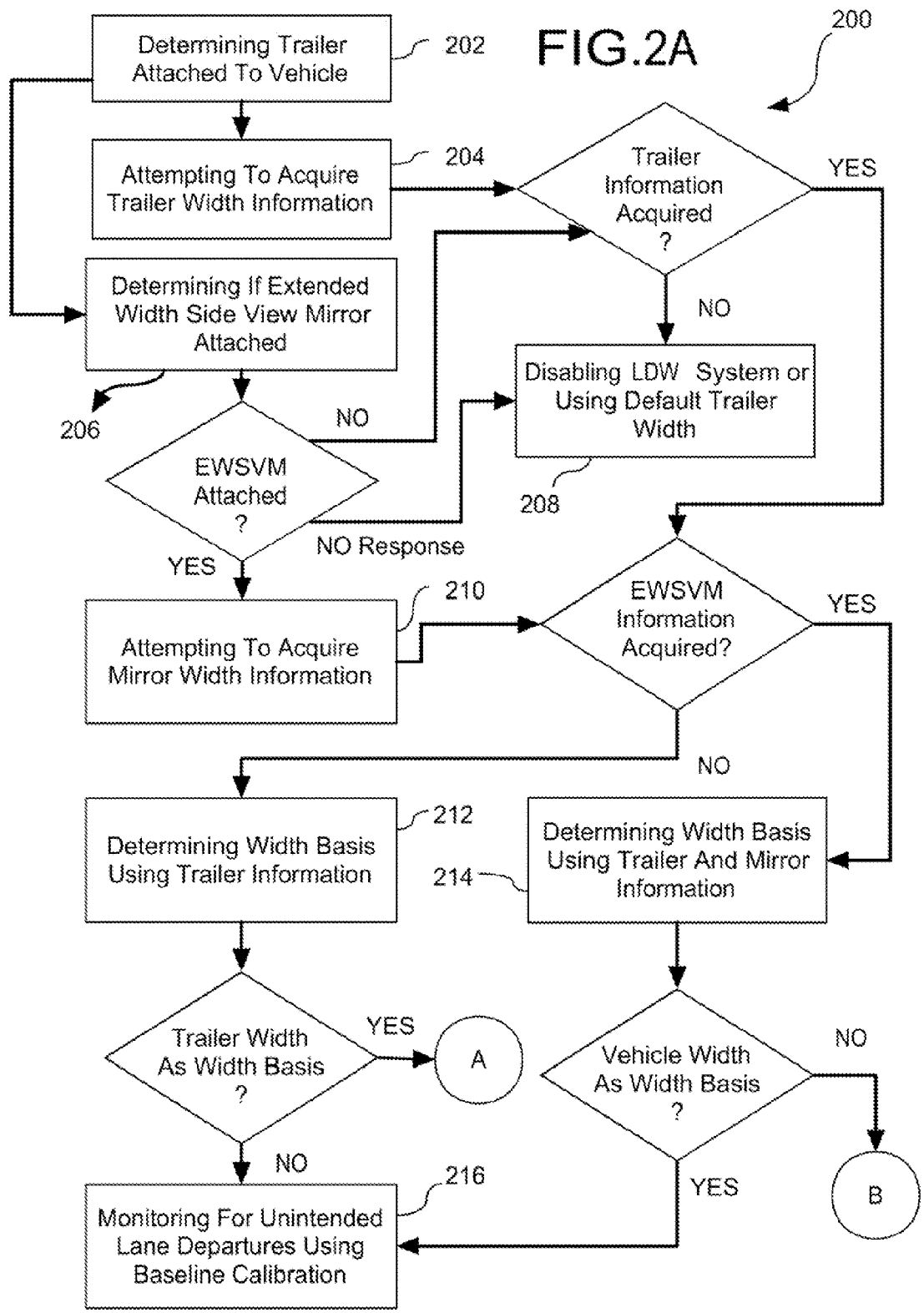

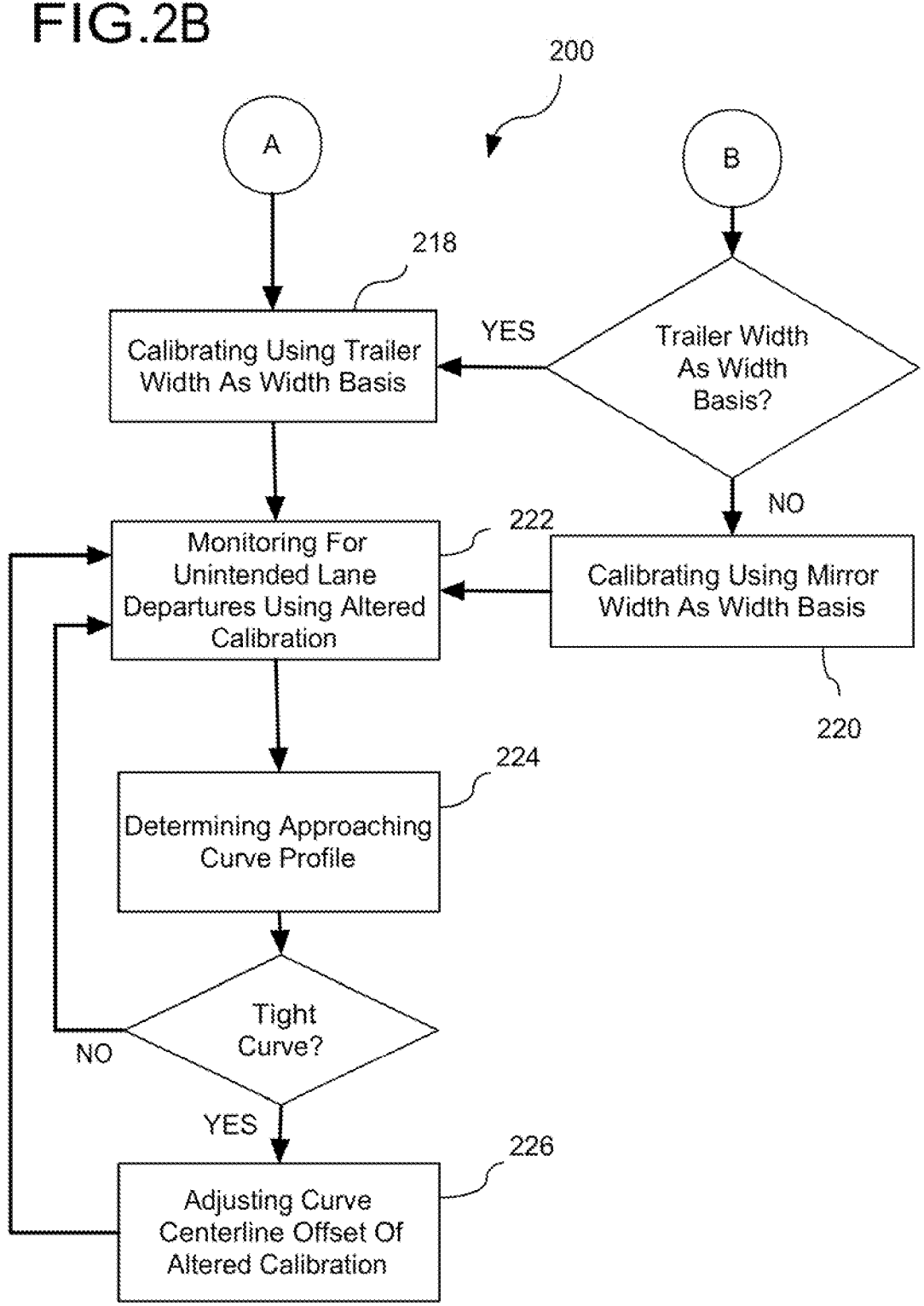

WIDTH CALIBRATION OF LANE DEPARTURE WARNING SYSTEM

FIELD OF THE DISCLOSURE

The disclosures made herein relate generally to driver assist features and, more particularly, to implementation of lane departure warning functionality for a vehicle used for towing a trailer.

BACKGROUND

A lane departure warning (LDW) system provides the functionality of alerting a driver of a vehicle when the vehicle departs a lane in which it is travelling without use of lane change indicators. In this regard, a LDW system interprets a lane departure without the use of a turn signal (e.g., when the vehicle is travelling at or above a particular speed) to be an unintentional lane departure. LDW systems respond to such an unintentional lane departure by providing audible feedback to the driver, by providing visual feedback to the driver, by providing tactile feedback to the drive, and/or by providing a steering input to counteract the unintended lane departure.

Existing LDW systems are nominally calibrated for detecting instances of unintentional lane departure based on a known width (e.g., track width and/or overall vehicle width) of a vehicle in which a particular LDW system is implemented. Presently, if a warning by a LDW system of a vehicle is needed based on a different track width and/or overall width, existing LDW systems do not offer a solution for appropriately updating/modifying a pre-set track width and/or overall width calibration for the vehicle. For example, when a vehicle equipped with a LDW system is pulling a trailer, the trailer is often wider than the vehicle. Furthermore, even when towing a trailer that has an overall width that is equal to or less than the width of the vehicle, side view mirrors that extend farther away from the vehicle than standard equipment mirrors (i.e., extended width side view mirrors) can sometimes be temporarily mounted on the vehicle to improve viewing performance. Such extended width side view mirrors are often used in the case where a trailer is relatively long regardless of its overall width. As such, these extended width side view mirrors now become the outer most portion of the vehicle.

Thus, there is a need for a solution to allow a vehicle operator to calibrate a LDW system of a vehicle for a set of LDW parameters at least partially based on a width of a trailer and/or non-standard vehicle equipment such as, for example, extended width side view mirrors.

SUMMARY OF THE DISCLOSURE

Embodiments of the present invention relate to lane departure warning (LDW) systems for vehicles. More specifically, a LDW system configured in accordance with the present invention allows a vehicle operator to calibrate a LDW system of a vehicle for a set of user-defined LDW parameters that are different than those provided by an original equipment manufacturer of the vehicle. For example, in the case where the vehicle is pulling a trailer that has a wider track width and/or overall width than the vehicle, a LDW system configured in accordance with the present invention will allow the vehicle operator to calibrate the LDW system based upon the wider track width and/or overall width of the trailer. Similarly, a LDW system configured in accordance with the present invention will allow the vehicle operator to calibrate the LDW system based upon non-standard equipment such as, for example, add-on mirrors or extendable mirror used while pulling a trailer. As such, embodiments of the present invention contribute to providing LDW functionality that overcomes shortcomings and/or drawbacks of prior art LDW systems.

In one embodiment of the present invention, a method is provided for providing lane departure warning functionality for a vehicle. The method comprises determining that a vehicle equipped with a lane departure warning system has a trailer attached thereto, acquiring trailer width information and/or extended width side view mirror information after determining that the vehicle has the trailer attached thereto, and calibrating the lane departure warning system using the trailer width information and/or the extended width side view mirror information in response to receiving the trailer width information and/or extended width side view mirror information such that the lane departure warning systems determines instances of unintended lane departure as a function of a width defined by the trailer and/or by an extended width side view mirror attached to the vehicle.

In another embodiment of the present invention, a lane departure warning system comprises a trailer detector for detecting that a trailer is attached to a vehicle, a lane boundary detector for detecting a position of a lane boundary on a roadway over which the vehicle is travelling, and an information processor including a calibrator for generating calibration parameters used in determining an unintended lane departure event with respect to the lane boundary. The information processor initiates a process for allowing a vehicle operator to provide trailer width information when the trailer detector indicates that the vehicle has the trailer attached thereto. The trailer width information is used by the information processor for generating said calibration parameters as a function of a width of the trailer.

In another embodiment of the present invention, a non-transitory processor-readable medium having tangibly embodied thereon and accessible therefrom a set of instructions interpretable by at least one data processing device. The set of instructions is configured for causing the at least one data processing device to carry out operations for determining that a vehicle equipped with a lane departure warning system has a trailer attached thereto, acquiring trailer width information after determining that the vehicle has the trailer attached thereto, and calibrating the lane departure warning system using the trailer width information in response to receiving the trailer width information such that the lane departure warning systems determines instances of unintended lane departure as a function of a width of the trailer as opposed to the width of the vehicle.

These and other objects, embodiments, advantages and/or distinctions of the present invention will become readily apparent upon further review of the following specification, associated drawings and appended claims.

BRIEF DESCRIPTION OF THE DRAWINGS

FIGS. 2A and 2B jointly show a flow diagram of a method for providing lane departure warning functionality in accordance with an embodiment of the present invention.

DETAILED DESCRIPTION OF THE DRAWING FIGURES

Figure 1A:
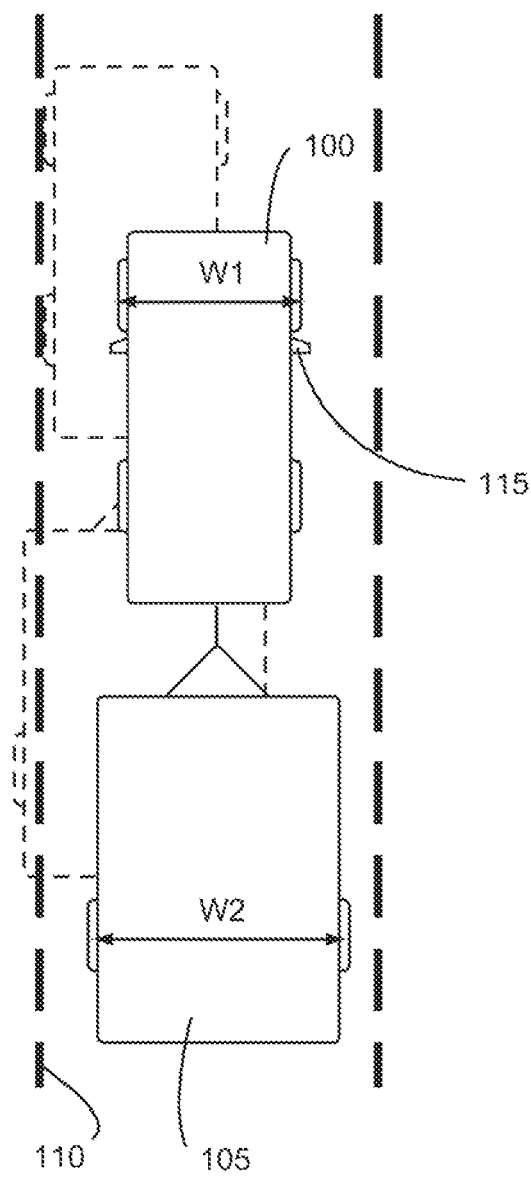
FIG. 1A is an illustrative view of a vehicle and trailer showing a scenario in which a width of a trailer attached to a vehicle has resulted in the trailer breaching a lane boundary even though the vehicle towing the trailer has not.
Figure 1B:
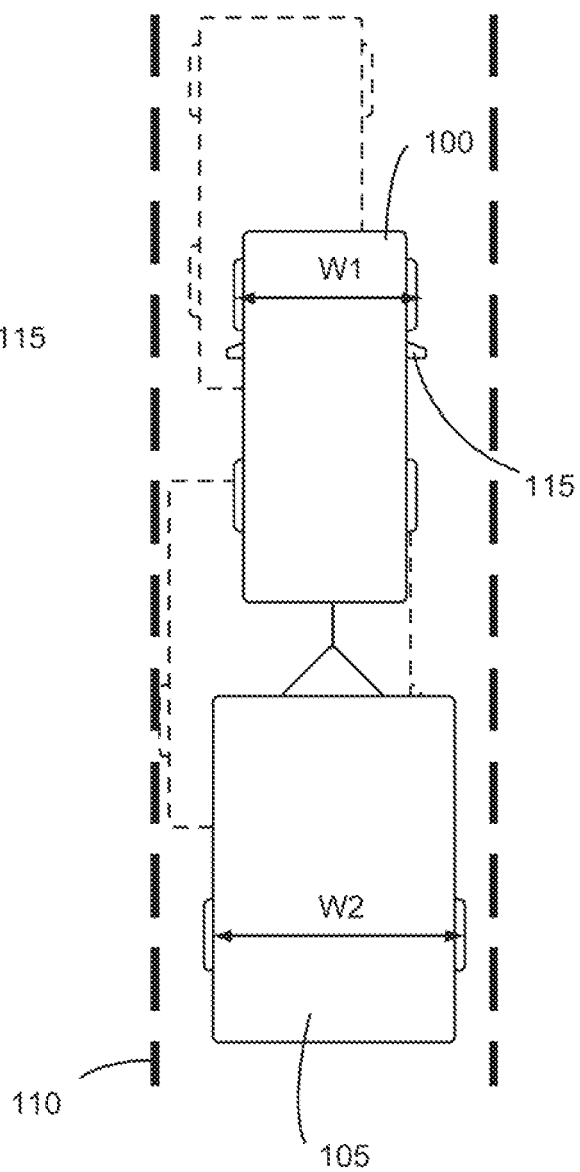
FIG. 1B is an illustrative view of the vehicle and trailer of FIG. 1 where a lane departure warning system of the vehicle is configured for monitoring for unintended lane departures based on a width defined by the trailer as opposed to a width defined by the vehicle.

Referring to FIGS. 1A and 1B, a vehicle 100 has a trailer 105 attached thereto. The vehicle 100 has a respective width W1 and the trailer 105 has a respective width W2. In the context of a lane departure warning (LDW) system configured in accordance with the present invention, a width of a vehicle or trailer can be defined by a number of different portions of the vehicle or trailer. In one example, a track width (referenced by tires of the vehicle or trailer) can define the width of the vehicle or trailer with respect to LDW functionality. In another example, an overall width of a body of the vehicle or trailer can define the width of the vehicle or trailer with respect to LDW functionality. In still another example, a width at a maximum width portion of a vehicle or trailer (e.g., as defined between side view mirrors of a vehicle) can define the width of the vehicle or trailer with respect to LDW functionality. As such, in the context of a lane departure warning (LDW) system configured in accordance with the present invention, a width of a vehicle or a trailer is not unnecessarily limited by a particular width dimension or location at which a width is specified.

Referring to FIG. 1A, when the trailer 105 has a wider width than does the vehicle 100, it can be seen that the trailer 105 exhibits encroachment or breaching with respect to a lane boundary 110 (e.g., a painted lane stripe) prior to the vehicle doing so. Accordingly, when the LDW system of the vehicle 100 has a baseline calibration that is a function of the vehicle width W1, the LDW system will not provide indication of an instance of unintended lane departure even though the trailer has experienced such an unintended lane departure. Baseline calibration refers to a calibration based on a preset width value (e.g., a prescribed/known width of the vehicle). Advantageously, as shown in FIG. 1B, a LDW system configured in accordance with an embodiment of the present invention allows for calibration of the LDW system to be defined such that warnings of actual or possible unintended lane departures are a function of the trailer width W2 as opposed to the vehicle width W1.

Figure 1C:
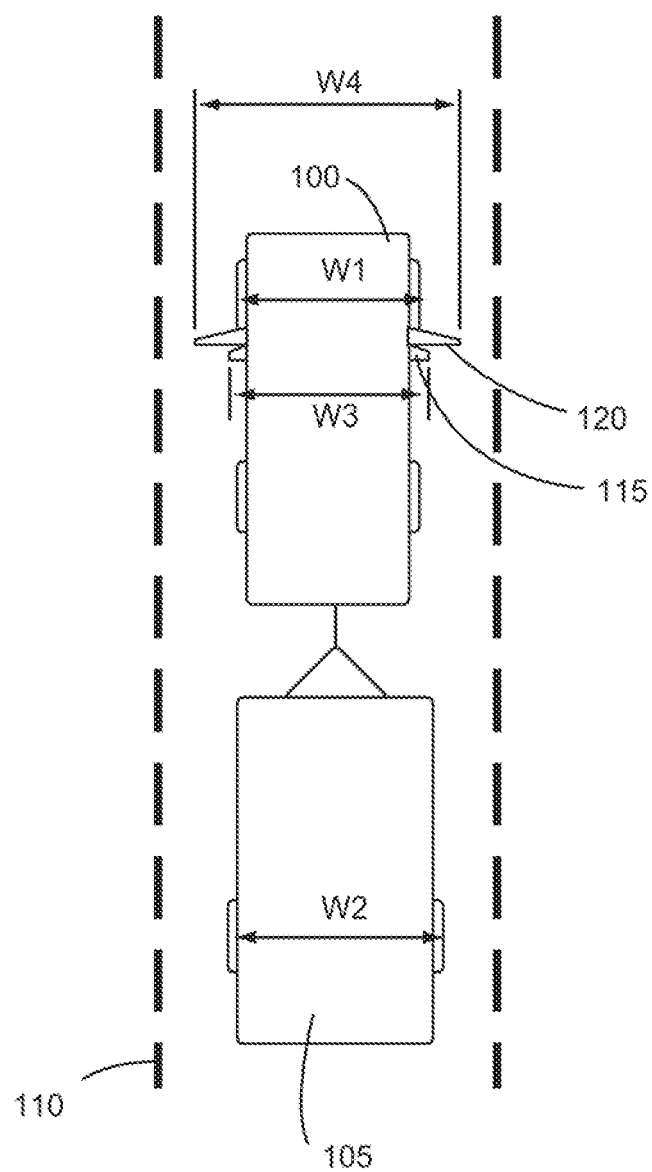
FIG. 1C is an illustrative view of the vehicle and trailer of FIG. 1A where a lane departure warning system of the vehicle is configured for monitoring for unintended lane departures based on a width defined by side view mirror mirrors added to the vehicle as opposed to a width defined by the vehicle or by the trailer.

Referring to FIG. 1C, the vehicle 100 is equipped with standard width side view mirrors 115 that are at a position that does not provide optimal or acceptable viewing performance when the trailer 105 is being pulled by the vehicle 100. To provide for such optimal or acceptable viewing performance when the trailer 105 is being pulled by the vehicle 100, the vehicle 100 can be provided with extended width side view mirrors 120, which are one example of add-on vehicle equipment that define a width basis for a LDW system. As can be seen in FIG. 1C, the standard width side view mirrors 115 define a vehicle width W3 and the extended width side view mirrors 120 define a vehicle width W4 that is greater than the vehicle width W3. It is disclosed herein that the extended width side view mirrors 120 can be implemented as add-on mirrors that are temporarily installed on the vehicle 100 or can be permanently installed. As such, the extended width side view mirrors 120 can define the width basis upon which the LDW system of the vehicle should be calibrated. Advantageously, embodiments of the present invention can be configured to allow for calibration of the LDW system to be defined such that warnings of actual or possible unintended lane departures are a function of the width W4 of extended width side view mirrors 120.

FIGS. 2A and 2B show a method 200 for providing lane departure warning functionality in accordance with an embodiment of the present invention. More specifically, the method 200 allows for calibration of a LDW system to be a function of the vehicle width W1, trailer width W2, or mirror width W4 such that warnings of actual or possible unintended lane departures can be a function of the vehicle width W1, the trailer width W2, or the mirror width W4. Furthermore, the method 200 also allows for calibration of the LDW system to be further altered in the case where the vehicle/trailer combination is or will travel through one or more curves having less than a particular radius. In the context of the disclosures made herein, a corner is defined to include a curve. In these regards, the method 200 enhances functionality of a LDW system of a vehicle that would otherwise be limited to providing warnings based only as a function of a width of the vehicle in which the LDW system is installed. In one embodiment, the method 200 is repeated for each cycling of the vehicle ignition key between on and off positions and LDW functionality is active only above a prescribed vehicle speed (e.g., above 40 mph).

An operation 202 is performed for determining that a trailer is attached to a vehicle equipped with a LDW system having a baseline calibration that is a function of the width of the vehicle. Examples of approaches for determining that the trailer is attached to the vehicle include, but are not limited to, detecting that the trailer is connected to trailer-specific electronics of the vehicle (e.g., a trailer circuit of a power distribution junction box, a trailer brake controller, and/or a trailer sway controller), using an image provided by a rear view or 180 degree side-view camera, using signal of parking aids that indicate a detected obstacle is at a constant distance while the vehicle is in motion, and/or sensing a change in overall vehicle mass that could be consistent with attachment of a trailer. However, it is disclosed herein that embodiments of the present invention are not unnecessarily limited to any particular means for detecting a trailer attached to a vehicle or determining that a trailer is attached to the vehicle.

In response to determining that a trailer is attached to the vehicle, an operation 204 is performed for attempting to acquire trailer width information and an operation 206 is performed for determining if an extended width side view mirror is attached to the vehicle. A preferred embodiment of determining if an extended width side view mirror is installed on the vehicle includes querying the vehicle operator if extended width side view mirrors have been installed on the vehicle. Such query can be made in response to determining that a trailer has been attached to the vehicle (e.g., using a trailer attachment determination technique discussed above). However, it is disclosed herein that embodiments of the present invention are not unnecessarily limited to any particular means or method for determining if one or more extended width side view mirrors are attached to a vehicle. In one embodiment, attempting to acquire the trailer width information includes querying an operator of the vehicle for a width of the trailer (i.e., inputting a trailer width value). It is disclosed herein that the trailer width value query may consist of operator input of trailer width value or selection from several preset trailer width options pre-programmed in the vehicle. In another embodiment, attempting to acquire the trailer width information includes outputting a trailer positioning instruction to an operator of the vehicle instructing the vehicle operator to maneuver the vehicle to position the trailer within a specified proximity to one or more lane boundaries on a roadway over which the vehicle is travelling (e.g., adjacent to a lane dividing boundary and/or a shoulder boundary). In another embodiment of the present invention, attempting to acquire the trailer width information includes accessing a maximum legal trailer width based upon specifications of the vehicle and/or municipality regulations where the vehicle is located. In still another embodiment of the present invention, attempting to acquire the trailer width information includes accessing a signal provided by one or more imaging devices (e.g., rearward looking and/or side looking cameras) of the vehicle. Additionally, a Telematics feature may be used to access off-board data on trailer width based on a model number or manufacturer entered by the driver. However, it is disclosed herein that embodiments of the present invention are not unnecessarily limited to any particular means for attempting to acquire trailer width information.

In response to the trailer width information not being successfully acquired (e.g., not being received after being requested) or there is no response to a query requesting confirmation that an extended width side view mirror is attached, an operation 208 is Performed for disabling the LDW system or using a default trailer width for calibrating the LDW system. If it is confirmed that an extended width side view mirror is not attached, the method continues at the output of the block 204 for attempting to acquire trailer width information. In one embodiment, using a default trailer width can include providing a notice to the vehicle operator that the LDW system has defaulted to the largest legal trailer width allowed for a GPS location of the vehicle. If the vehicle location or the largest legal allowable trailer cannot be established then the LDW system can then be disabled and, optionally, explain the rationale for such disabling. Alternatively, such use of the default trailer width can be omitted and the LDW system is disabled in response to the trailer width information not being successfully acquired.

In response to a determination being made that an extended width side view mirror is attached to the vehicle, an operation 210 is performed for attempting to acquire mirror width information. Such mirror width information refers to a reference distance as defined by an outermost edge of at least one extended width side view mirrors attached to the vehicle. In one embodiment, attempting to acquire mirror width information can include querying for a measured dimension from a known surface of the vehicle's door to the outermost edge portion the extended with side view mirror. In another embodiment, attempting to acquire mirror width information can include querying for a model number of the extended width side view mirror. In another embodiment, attempting to acquire mirror width information can include querying for a prescribed mirror indicating value provided by a trailer rental entity. In another embodiment, attempting to acquire mirror width information can include instructing a vehicle operator to park the vehicle inside a particular parking space that has an empty parking space in front of it that shares a common straight line with the particular parking space. In response to verify that the extended width side view mirror is inside the parking space lane (or mirrors inside the particular parking space in the case of left and right side mirrors being attached), the LDW system would acquire estimated mirror width information from the lines of the empty parking space using a forward looking camera. In another embodiment, attempting to acquire mirror width information can include querying for whether or not the extended width side view mirror extends outward farther than a deployable running board in its deployed position. In another embodiment, attempting to acquire mirror width information can include instructing the vehicle operator to pull the vehicle adjacent to a wall such that the extended width side view mirror is nearly touching the wall thereby allowing the extended width side view mirror information to acquired using a blind spot information system and/or outboard ultrasonic sensors. In another embodiment, attempting to acquire mirror width information can include attempting to detect an outermost point of the extended width side view mirror through use of side cameras that may be part of a 360-view system or added specifically for this purpose. In yet another embodiment, attempting to acquire mirror width information can include instructing the vehicle operator to pull the vehicle up to a reflective surface (e.g., a glass store front) and attempting to detect outermost point of the extended with side view mirror by using a front camera viewing a reflected image of the vehicle.

In response to the extended width side view mirror information not being successfully acquired and the trailer width information being successfully acquired, an operation 212 is performed using the trailer width information for determining a width basis upon which the LDW system is to be calibrated. In response to the extended width side view mirror information being successfully acquired and the trailer width information being successfully acquired, an operation 214 is performed using the trailer width information and extended width side view mirror information for determining a width basis upon which the LDW system is to be calibrated. The width basis refers to whether a width defined by e vehicle, a width defined by the extended width side view mirror, or a width defined by the trailer will be used by the LDW system in its calibration. The width basis will be that defined by the trailer if it is determined from the trailer width information, extended width side view mirror information, and, if needed, known vehicle width information that the width defined by the trailer is calculated or approximated to be greater than the width defined by the vehicle and the width defined by the extended width side view mirror(s). The width basis will be that defined by the extended width side view mirror(s) if it is determined from the trailer width information, extended width side view mirror information, and, if needed, known vehicle width information that the width defined by the extended width side view mirror(s) is calculated or approximated to be greater than the width defined by the vehicle and the width defined by the trailer. Otherwise, the width basis will be that defined by the width of the vehicle. In one example, a provided trailer width value can be compared against a known vehicle width value to determine the width basis. In another example, a position of the trailer and vehicle relative to a lane boundary (e.g., as identified by one or more cameras of the vehicle) can be used for estimating a difference between the trailer width and the vehicle width. In the context of a LDW system, calibrated refers to specification of parameters and/or generation of parameters that indicated when an instance of an unintended lane departure is taking place or is anticipated to take place without appropriate corrective action (e.g., corrective steering input). Examples of acquiring the trailer width information include, but are not limited to, receiving a query reply that specifies the width of the trailer, receiving acknowledgement that the vehicle operator has maneuvered the vehicle to position the trailer within the specified proximity to the lane boundary, and receiving a signal and/or data from one or more imaging devices of the vehicle.

If a width defined by the vehicle is determined to be the width basis for calibration, an operation 216 is performed for monitoring for unintended lane departures using the baseline calibration (e.g., a known or pre-defined width of the vehicle). In effect, the method terminates after initiating a default LDW functionality. It is disclosed herein that an operation for determining calibration parameters using the vehicle width can be performed prior to or as a part of the operation for monitoring for unintended lane departures using the baseline calibration.

If a width defined by the trailer is determined to be the width basis for calibration, an operation 218 is performed for calibrating the LDW system using the trailer width information (i.e., a trailer width based calibration). In one embodiment, such calibrating includes calculating, determining, and/or accessing calibration parameters upon which such monitoring will be performed. Accordingly, in this manner, functionality of the LDW system is based on the baseline calibration that is a function of the trailer width as opposed to a function of the vehicle width. Otherwise, if a width defined by the extended width side view mirror(s) is determined to be the width basis for calibration, an operation 220 is performed for calibrating the LDW system using the mirror width information (i.e., a mirror width based calibration). Following such calibrating, an operation 222 is performed for monitoring for unintended lane departures using appropriate width based calibration (e.g., a calibration corresponding to the trailer width information or a calibration corresponding to the mirror width information.

While monitoring for instances of unintended lane departure, an operation 224 is performed for determining if the vehicle is approaching (or within) a curve defined by the LDW system (or other vehicle system) as being a low-radius curve. Such a low-radius curve can be defined as such by any number of parameters including, but not limited to, ratio of a radius of the curve to a width of the trailer, a minimum radius of the curve, a maximum radius of the curve, ratio of min curve radius-to-max curve radius, profile of roadway immediately proceeding or following the curve, posted speed of the curve, posted speed of the roadway immediately proceeding the curve, etc. If it is determined that the vehicle is not approaching (or within) a tight curve, continue monitoring for unintended lane departures using the trailer width based calibration. Otherwise, if it is determined that the vehicle is approaching (or within) a tight curve, an operation 226 is performed for adjusting (e.g., increasing) a curve centerline offset parameter of the trailer width based calibration and continuing to monitor for unintended lane departures using the trailer width based calibration having an increased curve centerline offset parameter. In one embodiment, the curve centerline offset parameter is adjusted to compensate a warning zone of the LDW system to be further toward a center of the lane in which the vehicle is travelling than it would be on a straight road. In another embodiment, approaching the tight curve, the curve centerline offset parameter is adjusted to compensate the warning zone further toward the center of the lane to promote an inside to outside path of travel. In still another embodiment, the curve centerline offset parameter is adjusted to disable or counteract a normal curve cutting algorithm that reduces warnings so that the vehicle operator will be aware sooner that the trailer may be approaching a lane boundary. In another embodiment, the curve centerline offset parameter is adjusted dynamically based on trailer length and trailer angle to vehicle. Trailer angle can be detected through a rearward looking camera, and the trailer length can be input by the same method as trailer width.

Figure 3:
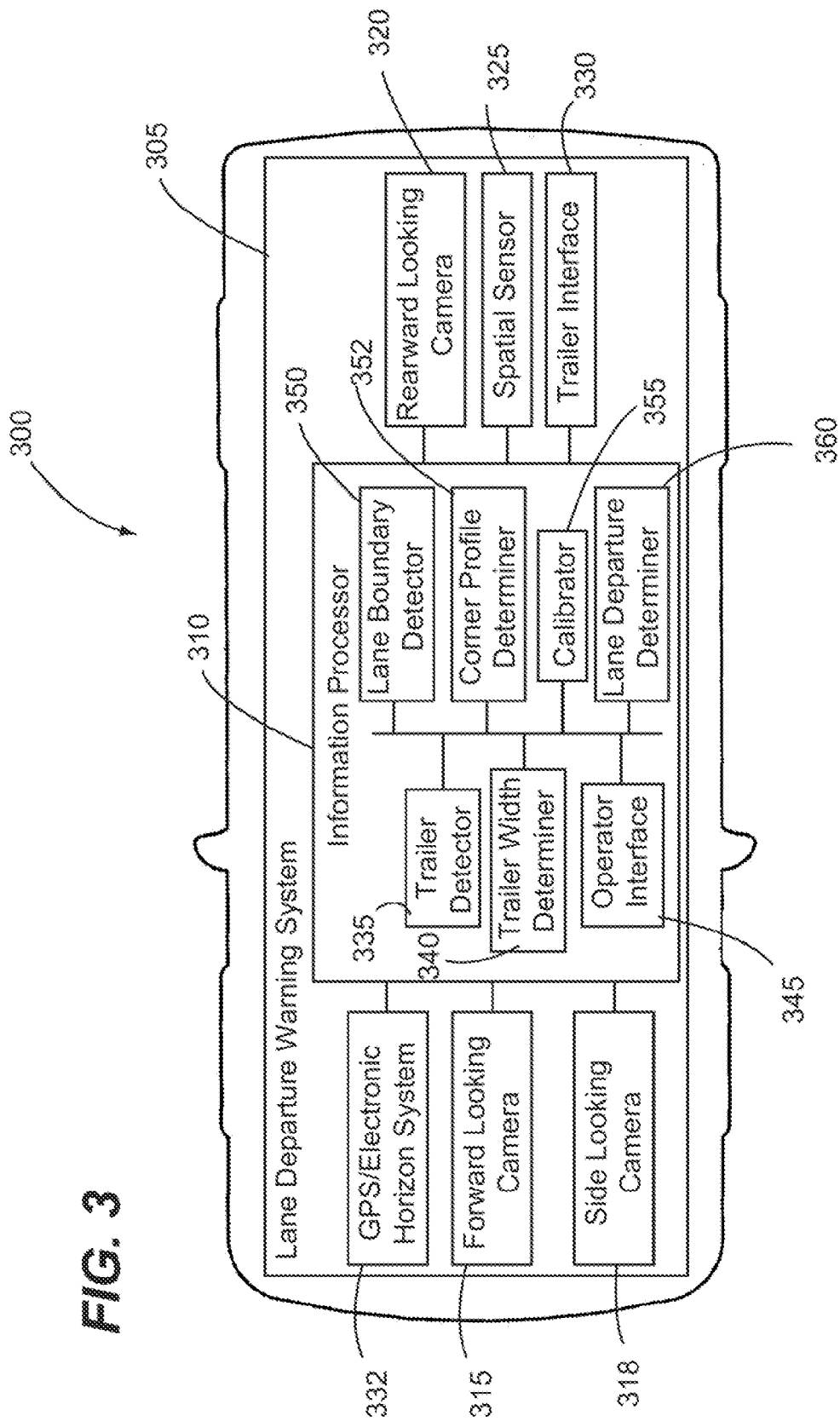
FIG. 3 is a block diagram of a vehicle having a LDW system configured in accordance with an embodiment of the present invention.

FIG. 3 shows a vehicle 300 having a LDW system 305 configured in accordance with an embodiment of the present invention. The LDW system 305 allows for LDW functionality to be a based on a width of the vehicle 300 or a width of a trailer attached to the vehicle 300 such that warnings of actual or possible unintended lane departures are a function of the vehicle width or the trailer width. In this regards, in a preferred embodiment, the LDW system 305 is configured for providing LDW functionality as disclosed above in reference to the method 200.

The LDW system 305 includes an information processor 310, a forward looking camera 315, a side looking camera 318, a rearward looking camera 320, a spatial sensor 325, a trailer interface 330 and GPS/electronic horizon system 332. The information processor 310 is coupled to the forward looking camera 315, the rearward looking camera 320, the spatial sensor 325, the trailer interface 330 and GPS/electronic horizon system 332 for allowing information (e.g., data, signals, etc) to be communicated therebetween. It is disclosed herein that the forward looking camera 315, the rearward looking camera 320, the spatial sensor 325, and the trailer interface 330 may or may not be dedicated elements of the LDW system 305 in that one or more of these system components may be utilized by another system of the vehicle 300.

The information processor 310 acquires information from the forward looking camera 315, the rearward looking camera 320, the spatial sensor 325, and/or the trailer interface 330 and/or the GPS/electronic horizon system 332 for implementing LDW functionality. The information processor 310 can acquire information from the forward looking camera 315 and the side looking camera 318 for determining lane boundaries, thus making such cameras part of a lane boundary detecting apparatus. The information processor 310 can acquire trailer width information from the side looking camera 318 and/or the rearward looking camera 320, thus making such cameras part of a trailer detecting apparatus. The information processor 310 can also acquire trailer width information from the spatial sensor 325, thus making the spatial sensor part of a trailer detecting apparatus. Ultrasonic sensors, Infrared sensors, or radar sensors are examples of the spatial sensor 325. The trailer interface, which is an electrical interface between the vehicle 305 and an attached trailer, can provide information to the information processor for detecting presence of the attached trailer (i.e., that it is attached to the vehicle 300). It is disclosed herein that a trailer detector can detect that the trailer is attached to the vehicle 300 and a lane boundary detector can detect a position of a lane boundary on a roadway over which the vehicle 300 is travelling.

The information processor includes a trailer detector 335, a trailer width determiner 340, an operator interface 345, a lane boundary detector 350, a curve profile determiner 352, a calibrator 355, and a lane departure determiner 360. In a preferred embodiment, the trailer detector 335, the trailer width determiner 340, the operator interface 345, the lane boundary detector 350, the curve profile determiner 352, the calibrator 355, and the lane departure determiner 360 are coupled together for allowing communication of data/information therebetween. The trailer detector 335 detects attachment of a trailer to the vehicle 300, such as through use of information provided by the rearward looking camera 320, the spatial sensor 325, and/or the trailer interface 330. The trailer width determiner 340 determines a quantitative width of the trailer (e.g., trailer width value) and/or qualitative width of the trailer (e.g., wider than the vehicle but not wider than a maximum legal trailer width). The operator interface 345 outputs information queries to an operator of the vehicle and/or receives information query replies from the vehicle operator. For example, in a preferred embodiment, the operator interface 345 can output a trailer positioning instruction for reception by the vehicle operator and/or output a trailer width value query for reception by the vehicle operator. The lane boundary detector 350 detects one or more lane boundaries of a roadway over which the vehicle 300 is travelling, such as through use of information provided by the forward looking camera 315. The curve profile determiner 352 determines information relating to a relative tightness of a curve that the vehicle is approaching or is within, such as through use of information provided by the forward looking camera 315 and/or a global positioning system of the vehicle 300. The calibrator 355 provides calibration parameters upon which LDW monitoring will be performed. Such calibration parameters can be based on information acquired from the trailer detector 335, the trailer width determiner 340, the operator interface 345, the lane boundary detector 350 and/or the curve profile determiner 352. The lane departure determiner 360 uses the calibration parameters and information from the lane boundary detector 350 to monitor for instances of unintended lane departures.

Referring now to instructions processible by a data processing device, it will be understood from the disclosures made herein that methods, processes and/or operations adapted for carrying out lane departure warning functionality as disclosed herein are tangibly embodied by non-transitory computer readable medium having instructions thereon that are configured for carrying out such functionality. In one specific embodiment, the instructions are tangibly embodied for carrying out the method 200 disclosed above in reference to FIGS. 2A and 2B. The instructions may be accessible by one or more data processing devices from a memory apparatus (e.g. RAM, ROM, virtual memory, hard drive memory, etc), from an apparatus readable by a drive unit of a data processing system (e.g., a diskette, a compact disk, a tape cartridge, etc) or both. In one embodiment of the present invention, the information processor 310 includes such data processing device and memory with such instructions being configured for carrying out the functionalities of the trailer detector 335, the trailer width determiner 340, the operator interface 345, the lane boundary detector 350, the calibrator 355, the lane departure determiner 360, and the curve profile determiner 365. Accordingly, embodiments of non-transitory computer readable medium in accordance with the present invention include a compact disk, a hard drive, RAM or other type of storage apparatus that has imaged thereon a computer program (i.e., instructions) adapted for carrying out lane departure warning functionality in accordance with the present invention.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method for providing lane departure warning functionality for a vehicle, the method comprising:
   determining that a vehicle equipped with a lane departure warning system has a trailer attached;
   acquiring a trailer width information and extended width side view mirror width information after determining that the vehicle has the trailer attached; and
   calibrating the lane departure warning system using said trailer width information and said extended width side view mirror width information in response to receiving said trailer width information and said extended width side view mirror width information, the lane departure warning systems determines instances of unintended lane departure as a function of a width defined by the trailer and a width defined an extended width side view mirror attached to the vehicle.

2. The method of claim 1, further comprising:
   outputting a trailer positioning instruction to an operator of the vehicle during operation of the vehicle after determining that the trailer is attached to the vehicle, wherein the trailer positioning instruction specifies positioning the trailer within a specified proximity to a lane boundary on a roadway over which the vehicle is traveling and wherein receiving the trailer width information includes receiving confirmation that the trailer is positioned as requested in the trailer positioning instruction.

3. The method of claim 1, further comprising:
   outputting a trailer width value query to an operator of the vehicle during operation of the vehicle after determining that the trailer is attached to the vehicle, wherein receiving the trailer width information includes receiving a trailer width value indicating a width of the trailer.

4. The method of claim 1 wherein receiving said trailer width information includes accessing an output signal of at least one camera of the vehicle for determining the width of the trailer.

5. The method of claim 1, further comprising:
   one of defaulting to a maximum legal trailer width and disabling the lane departure warning system in response to not receiving said trailer width information.

6. The method of claim 1, further comprising:
   determining that instances of unintended lane departure should be determined as a function of said trailer width information as opposed to vehicle width information in response to determining that the vehicle has the trailer attached thereto.

7. The method of claim 6, further comprising:
   outputting a trailer positioning instruction to an operator of the vehicle during operation of the vehicle after determining that instances of unintended lane departure should be determined as a function said trailer width information, wherein the trailer positioning instruction specifies positioning the trailer within a specified proximity to a lane boundary on a roadway over which the vehicle is traveling and wherein receiving the trailer width information includes receiving confirmation that the trailer is positioned as requested in the trailer positioning instruction.

8. The method of claim 6, further comprising:
   outputting a trailer width value query to an operator of the vehicle during operation of the vehicle after determining that instances of unintended lane departure should be determined as a function said trailer width information, wherein receiving the trailer width information includes receiving a trailer width value indicating a width of the trailer.

9. The method of claim 6, further comprising:
one of defaulting to a maximum legal trailer width and disabling the lane departure warning system in response to not receiving said trailer width information.

10. The method of claim 1, further comprising:
determining a width basis upon which to perform said calibrating;
wherein acquiring at least one of said trailer width information and said extended width side view mirror width information comprises acquiring said trailer width information and said extended width side view mirror width information;
wherein determining the width basis is the greater of a width defined by the trailer and a width defined by the extended width side view mirror is greater; and
wherein calibrating the lane departure warning system is performed as a function of the width basis.

11. The method of claim 1, further comprising:
determining that an extended width side view mirror is attached to the vehicle in response to determining that the vehicle has the trailer attached thereto;
wherein acquiring at least one of said trailer width information and said extended width side view mirror width information comprises acquiring both
said trailer width information and said extended width side view mirror width information in response to determining that the extended width side view mirror is attached to the vehicle.

12. The method of claim 11, further comprising:
determining a width basis upon which to perform said calibrating;
wherein acquiring at least one of said trailer width information and said extended width side view mirror width information comprises acquiring said trailer width information and said extended width side view mirror width information;
wherein determining the width basis is the greater of a width defined by the trailer and a width defined by the extended width side view mirror is greater; and
wherein calibrating the lane departure warning system is performed as a function of the width basis.

13. A lane departure warning system, comprising:
a trailer detector for detecting that a trailer is attached to a vehicle;
a lane boundary detector for detecting a position of a lane boundary on a roadway over which the vehicle is traveling; and
an information processor including a calibrator for generating calibration parameters used in determining an unintended lane departure event with respect to the lane boundary, wherein the information processor initiates a process for allowing a vehicle operator to provide trailer width information when the trailer detector indicates that the vehicle has the trailer attached and Wherein the trailer width information is used by the information processor for generating said calibration parameters as a function of a width of the trailer.

14. The lane departure warning system of claim 13 wherein the information processor includes a trailer width determiner for determining that instances of unintended lane departure should be determined as a function of a width of the trailer as opposed to the width of the vehicle.

15. The lane departure warning system of claim 14 wherein the trailer width determiner uses information provided by at least one camera of the vehicle for determining that instances of unintended lane departure should be determined as a function of the width of the trailer.

16. The lane departure warning system of claim 13 wherein the information processor includes an operator interface for allowing an operator of the vehicle to provide said trailer width information.

17. The lane departure warning system of claim 16 wherein the operator interface provides for at least one of:
outputting a trailer positioning instruction to the operator of the vehicle; and
outputting a trailer width value query to the operator of the vehicle.

18. The lane departure warning system of claim 17 wherein the information processor includes a trailer width determiner for determining that instances of unintended lane departure should be determined as a function of a width of the trailer as opposed to the width of the vehicle, wherein the trailer width determiner uses information provided by at least one camera of the vehicle for determining that the width of the trailer is greater than the width of the vehicle.

19. A non-transitory processor-readable medium having tangibly embodied thereon and accessible therefrom a set of instructions interpretable by at least one data processing device, said set of instructions configured for causing said at least one data processing device to carry out operations for:
determining that a vehicle equipped with a lane departure warning system has a trailer attached;
acquiring trailer width information after determining that the vehicle has the trailer attached; and
calibrating the lane departure warning system using said trailer width information in response to receiving said trailer width information that is greater than a known vehicle width the lane departure warning systems determines instances of unintended lane departure as a function of a width of the trailer as opposed to the width of the vehicle.

20. The non-transitory processor-readable medium of claim 19, further comprising:
outputting a trailer positioning instruction to an operator of the vehicle during operation of the vehicle after determining that the trailer is attached to the vehicle, wherein the trailer positioning instruction specifies positioning the trailer within a specified proximity to a lane boundary on a roadway over which the vehicle is traveling and wherein receiving the trailer width information includes receiving confirmation that the trailer is positioned as requested in the trailer positioning instruction.

21. The non-transitory processor-readable medium of claim 19, further comprising:
outputting a trailer width value query to an operator of the vehicle during operation of the vehicle after determining that the trailer is attached to the vehicle, wherein receiving the trailer width information includes receiving a trailer width value indicating a width of the trailer.

22. The non-transitory processor-readable medium of claim 19 wherein receiving said trailer width information includes accessing an output signal of at least one camera of the vehicle for determining the width of the trailer.

23. The non-transitory processor-readable medium of claim 19, further comprising:
determining that instances of unintended lane departure should be determined as a function said trailer width information as opposed to vehicle width information in response to determining that the vehicle has the trailer attached and trailer width information that is greater than a known vehicle width.

* * * * *